United States Patent
Li et al.

(10) Patent No.: US 12,022,486 B2
(45) Date of Patent: Jun. 25, 2024

(54) FEEDBACK INFORMATION TRANSMISSION METHOD AND A TERMINAL DEVICE

(71) Applicant: VIVO MOBILE COMMUNICATION CO., LTD., Chang'an Dongguan (CN)

(72) Inventors: Na Li, Chang'an Dongguan (CN); Xiaodong Shen, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 481 days.

(21) Appl. No.: 17/314,302

(22) Filed: May 7, 2021

(65) Prior Publication Data

US 2021/0266946 A1    Aug. 26, 2021

Related U.S. Application Data

(63) Continuation of application No. PCT/CN2019/104983, filed on Sep. 9, 2019.

(30) Foreign Application Priority Data

Nov. 7, 2018    (CN) .......................... 201811321698.1

(51) Int. Cl.
*H04W 72/23* (2023.01)
*G09G 3/36* (2006.01)
(Continued)

(52) U.S. Cl.
CPC ........... *H04W 72/23* (2023.01); *H04L 1/1812* (2013.01); *H04W 72/1273* (2013.01); *G09G 3/3674* (2013.01); *G09G 2310/0286* (2013.01)

(58) Field of Classification Search
CPC ............. H04W 72/23; H04W 72/1273; H04W 72/0446; H04W 72/21; H04L 1/1812;
(Continued)

(56) References Cited

U.S. PATENT DOCUMENTS

2014/0044092 A1    2/2014  Guan et al.
2015/0208391 A1    7/2015  Park
(Continued)

FOREIGN PATENT DOCUMENTS

CN    102752085 A    10/2012
CN    104704758 A    6/2015
(Continued)

OTHER PUBLICATIONS

Korean Office Action related to KR Application No. 10-2021-7017033, dated Apr. 20, 2023.
(Continued)

*Primary Examiner* — Jung H Park
(74) *Attorney, Agent, or Firm* — von Briesen & Roper, s.c.

(57) ABSTRACT

The embodiments of the present invention provide a feedback information transmission method and a terminal device, which relate to the field of communications technologies and are used to resolve the problem of how a terminal device sends feedback information in a multi-TRP communications system. The method is applied to a terminal device and includes: in the case of receiving at least two PDCCHs sent by at least two TRPs or different antenna panels of one TRP, determining a target PUCCH resource, and sending target feedback information through the target PUCCH resource, where the target feedback information is feedback information of each PDSCH scheduled by the at least two PDCCHs. The embodiments of the present invention are used for the transmission of feedback information.

20 Claims, 5 Drawing Sheets

(51) Int. Cl.
*H04L 1/1812* (2023.01)
*H04W 72/1273* (2023.01)

(58) Field of Classification Search
CPC .............. H04L 1/1861; H04L 5/0035; H04L 5/0055; H04L 1/1854; H04L 1/1607; G09G 3/3674; G09G 2310/0286
See application file for complete search history.

(56) References Cited

U.S. PATENT DOCUMENTS

| | | | |
|---|---|---|---|
| 2019/0373592 | A1 | 12/2019 | Ji et al. |
| 2019/0386785 | A1 | 12/2019 | Zhou |
| 2021/0352629 | A1* | 11/2021 | Haghighat ............ H04W 72/23 |
| 2021/0392673 | A1* | 12/2021 | Miao ................. H04W 72/1268 |
| 2022/0287066 | A1* | 9/2022 | Xiong ..................... H04B 7/063 |
| 2023/0208490 | A1* | 6/2023 | Kim ...................... H04L 5/0051 370/329 |

FOREIGN PATENT DOCUMENTS

| | | |
|---|---|---|
| CN | 107113122 A | 8/2017 |
| CN | 108282198 A | 7/2018 |
| CN | 108737010 A | 11/2018 |
| WO | 2016182405 A1 | 11/2016 |

OTHER PUBLICATIONS

R1-1810104, Source: Huawei, HiSilicon, "Enhancements on multi-TRP/panel transmission" Document for: Discussion and Decision, Agenda item: 7.2.8.2, Release: 3GPP TSG RAN WG1 Meeting #94bis, Oct. 8-12, 2018, Chengdu, China.

International Search Report & Written Opinion related to Application No. PCT/CN2019/104983; dated Nov. 28, 2019.
First Chinese Office Action for related Application No. 201811321698.1; dated Oct. 19, 2020.
Huawei, HiSilicon, "Enhancements on multi-TRP/panel transmission in NR", Aug. 20-24, 2018, 3GPP TSG RAN WG1 Meeting#94, Gothenburg, Sweden.
Japanese Reasons For Refusal Office Action related to JP Application No. 2021-523296 dated May 13, 2022.
R1-1812381, Source: ZTE, "Remaining issues on NR PUCCH" Document for: Discussion and decision, Agenda item: 7.1.3.2, Release: 3GPP TSG RAN WG1 Meeting #95, Nov. 12-16, 2018, Spokane, USA.
R1-1813442, Source: Qualcomm Incorporated, "Multi-TRP Enhancements" Document for: Discussion/Decision, Agenda item: 7.2.8.2, Release: 3GPP TSG-RAN WG1 Meeting #95, Nov. 12-16, 2018, Spokane, WA, USA.
R1-1901702, Source: vivo, "Further Discussion on Multi-TRP Transmission" Document for: Discussion and Decision, Agenda item: 7.2.8.2, Release: 3GPP TSG RAN1 #96, Feb. 25-Mar. 1, 2019, Athens, Greece.
3GPP TS 38.213 V15.3.0 3rd Generation Partnership Project; Technical Specification Group Radio Access Network; NR; Physical layer procedures for control; (Release 15) V15.3.0 (Sep. 2018).
Extended European Search Report for related Application No. 19882077.1; dated Nov. 24, 2021.
Vivo, "Consideration on multi TRP transmission for URLLC", Nov. 12-16, 2018, 3GPP TSG RAN WG1 Meeting #95, Spokane, USA.
Panasonic, "On multi-TRP enhancements for NR MIMO in Rel. 16", Nov. 12-16, 2018, 3GPP TSG RAN WG1 Meeting #95, Spokane, USA.

* cited by examiner

FEEDBACK INFORMATION TRANSMISSION METHOD AND A TERMINAL DEVICE

CROSS-REFERENCE TO RELATED APPLICATION

The present application is a continuation application of International Application No. PCT/CN2019/104983 filed on Sep. 9, 2019, which claims priority of Chinese Patent Application No. 201811321698.1, filed with the China National Intellectual Property Administration on Wednesday, Nov. 7, 2018, and entitled "A FEEDBACK INFORMATION TRANSMISSION METHOD AND A TERMINAL DEVICE", both of which are incorporated herein by reference in their entireties.

TECHNICAL FIELD

The embodiments of the present invention relate to the field of communications technologies, and in particular, to feedback information transmission method and a terminal device.

BACKGROUND

At present, a scenario of multi transmission reception point (multi Transmission Reception Point, multi-TRP)/multi-antenna panel (multi-antenna panel, multi-panel) is proposed in the related art. In the TRP/multi-panel scenario, a terminal device may receive the same or different data from multiple TRPs or multiple panels of one TPR, so multi-TRP/multi-panel transmission can increase transmission reliability and throughput.

A hybrid automatic repeat request ACK (Hybrid Automatic Repeat reQuest ACK, HARQ-ACK) feedback in a multi-TRP communications system may be: physical downlink shared channels (Physical Downlink Shared Channel, PDSCH) of multiple TRPs jointly feed back a physical uplink control channel (Physical Uplink Control Channel, PUCCH), that is, HARQ-ACKs of different TRPs are joined together for feedback, or the PDSCHs of multiple TRPs are fed back to the PUCCH respectively, or PDSCHs of multiple TRPs feed back PUCCHs respectively, that is, HARQ-ACK feedbacks of different TRPs are transmitted on different PUCCHs. When HARQ-ACKs are jointly fed back on one PUCCH, multiple TRPs that send multiple PDSCHs to a terminal device will send multiple physical downlink control channels (Physical Downlink Control Channel, PDCCH) to the terminal device, that is, each PDCCH schedules one PDSCH. In the case that multiple scheduled PDSCHs are fed back in one slot, the terminal device only feeds back one PUCCH, so the terminal device only needs to determine one PUCCH resource for sending the HARQ-ACKs. In a single TRP scenario of NR R15, when there are multiple PDSCHs in one slot that need to feed back an HARQ-ACK, a terminal device only needs to sort multiple pieces of DCI carried by multiple PDCCHs according to monitoring occasions (monitoring occasion) and serving cell indexes (serving cell index) of the PDCCHs, so as to determine the last downlink control information (last Downlink Control Information, last DCI), and determine, according to the last DCI, a resource for sending feedback information. However, in a multi-TRP scenario, a same monitoring occasion of PDCCH may schedule multiple PDSCHs in a same serving cell. Therefore, the method of determining a resource for sending a PUCCH in a single TRP scenario cannot be applied to the multi-TRP scenario.

That is, in the case that HARQ-ACKs for PDSCHs of multiple TRPs are jointly fed back on one PUCCH, how a terminal device sends feedback information is an urgent problem to be resolved. In addition, in the case that PDSCHs of multiple TRPs feed back HARQ-ACKs respectively, that is, PDSCHs of different TRPs are fed back on different PUCCHs, when PUCCH resources for sending feedback information of the multiple TRPs overlap in a time domain and there is no spatial relation information (spatial relation information) available for at least one of the multiple PUCCH resources, the terminal cannot send multiple PUCCHs simultaneously; or in the case that at least two PUCCH resources in multiple PUCCH resources for sending feedback information overlap in a time domain and spatial relation information of the at least two PUCCH resources in the multiple PUCCH resources corresponds to a same antenna panel, the terminal cannot send multiple PUCCHs on one antenna panel simultaneously due to the limitation of the terminal's MIMO capability.

In summary, how a terminal device sends feedback information in a multi-TRP communications system is an urgent problem to be resolved.

SUMMARY

Embodiments of the present invention provide a feedback information transmission method and a terminal device, which are used to resolve the problem of how a terminal device sends feedback information in a multi-TRP communications system.

To resolve the foregoing technical problem, this application is implemented as follows:

According to a first aspect, an embodiment of the present invention provides a feedback information transmission method applied to a terminal device, where the method includes:

determining a target PUCCH resource in the case of receiving at least two PDCCHs sent by at least two TRPs or different antenna panels of one TRP; and sending target feedback information through the target PUCCH resource, where the target feedback information is feedback information of each PDSCH scheduled by the at least two PDCCHs.

According to a second aspect, an embodiment of the present invention provides a terminal device, including:

a processing unit, configured to determine a target PUCCH resource in the case of receiving at least two PDCCHs sent by at least two TRPs or different antenna panels of one TRP; and a sending unit, configured to send target feedback information through the target PUCCH resource, where the target feedback information is feedback information of each PDSCH scheduled by the at least two PDCCHs.

According to a third aspect, an embodiment of the present invention provides a terminal device, including a processor, a memory, and a computer program that is stored in the memory and that can run on the processor, and when the computer program is executed by the processor, the steps of the feedback information transmission method according to the first aspect are implemented.

According to a fourth aspect, an embodiment of the present invention provides a computer-readable storage medium, where the computer-readable storage medium stores a computer program, and when the computer program is executed by a processor, the steps of the feedback information transmission method according to the first aspect are implemented.

In the feedback information transmission method according to the embodiment of the present invention, in the case of receiving at least two PDCCHs sent by at least two transmission reception points TRPs or different antenna panels of one TRP, a target PUCCH resource is determined first, and then target feedback information of each PDSCH scheduled by the at least two PDCCHs is sent through the target PUCCH resource.

That is, the embodiment of the present invention provides a method for transmitting feedback information in a multi-TRP communications system. Therefore, the embodiment of the present invention may be used to resolve the problem of how a terminal device sends feedback information in a multi-TRP scenario, improving communication effectiveness and reliability.

DETAILED DESCRIPTION

Figure 1:
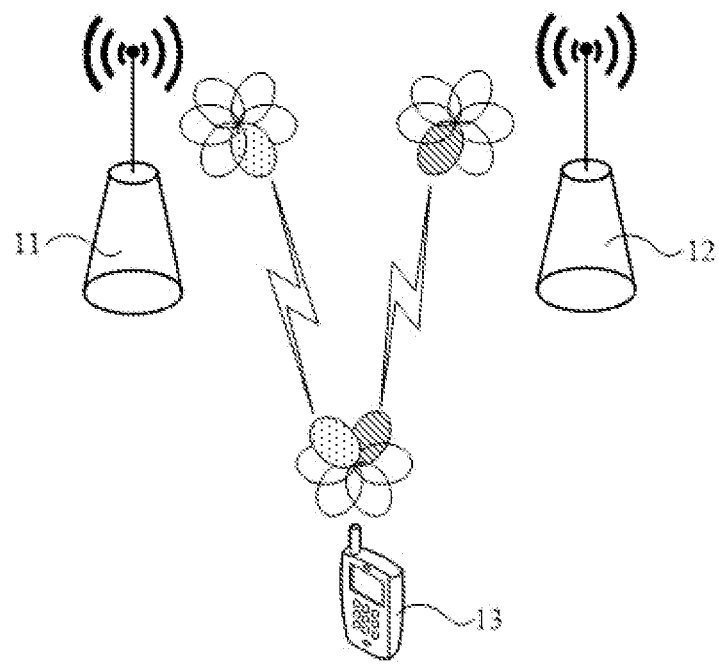
FIG. 1 is an architectural diagram of a multi-TRP communications system according to an embodiment of the present invention.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

In this specification, the term "and/or" is merely an association relationship that describes associated objects, and represents that there may be three relationships. For example, A and/or B may represent three cases: only A exists, both A and B exist, and only B exists.

In the specification and claims of this application, the terms such as "first" and "second" are used to distinguish different objects, but are not used to describe a particular sequence of the objects. For example, a first demonstration operation and a second demonstration operation are intended to distinguish between different demonstration operations, but do not describe a particular order of the demonstration operations.

In the embodiments of the present invention, the term such as "exemplary" or "for example" is used to indicate an example, an instance, or a description. Any embodiment or design solution described as "exemplary" or "for example" in the embodiments of the present invention should not be construed as being more preferred or advantageous than other embodiments or design solutions. To be precise, the use of the term such as "exemplary" or "for example" is intended to present a related concept in a specific manner. In addition, in the description of the embodiments of the present invention, unless otherwise specified, the meaning of "multiple" means two or more.

In a multi-TRP scenario, a same PDCCH monitoring occasion can schedule multiple physical downlink shared channels (Physical Downlink Shared Channel, PDSCH) in a same serving cell. Therefore, the method of determining a resource for sending a PUCCH in a single TRP scenario cannot be applied to a multi-TRP scenario. In the case that PDSCHs of multiple TRPs feed back HARQ-ACKs on different PUCCHs, and multiple PUCCH resources for sending feedback information overlap in a time domain and there is no spatial relation information (spatial relation information) available for at least one of the multiple PUCCH resources, the terminal cannot send multiple PUCCHs simultaneously; or in the case that at least two PUCCH resources in multiple PUCCH resources for sending feedback information overlap in a time domain and spatial relation information of the at least two PUCCH resources in the multiple PUCCH resources corresponds to a same antenna panel, the terminal cannot send multiple PUCCHs on one antenna panel simultaneously. For that reason, how a terminal device sends feedback information in a multi-TRP communications system is an urgent problem to be resolved.

An embodiment of the present invention provides a feedback information transmission method and a terminal device to resolve the problem. In the feedback information transmission method, in the case of receiving at least two physical downlink control channels PDCCHs sent by at least two transmission reception points TRPs or different antenna panels of one TRP, a target PUCCH resource is determined first, and then target feedback information of each PDSCH scheduled by the at least two PDCCHs is sent through the target PUCCH resource. That is, the embodiment of the present invention provides a method for transmitting feedback information in a multi-TRP communications system. Therefore, the embodiment of the present invention may be used to resolve the problem of how a terminal device sends feedback information in a multi-TRP scenario, improving communication effectiveness and reliability.

FIG. 1 is a possible schematic structural diagram of a communications system according to an embodiment of the present invention. As shown in FIG. 1, the communications system related in the embodiment of the present invention may include: multiple TRPs (FIG. 1 illustrates two TRPs including TRP1 and TRP2 as an example) and a terminal device 13, where both TRP1 11 and TRP2 12 establish a wireless connection with the terminal device 13 through radio resource control (Radio Resource Control, RRC) signaling.

Specifically, the foregoing TRP may also be referred to as a radio access network (Radio Access Network, RAN) device, which is a device that connects a terminal to a radio network, and that includes but is not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (such as Home evolved NodeB or Home Node B, HNB), a base band unit (BaseBand Unit, BBU), a wireless fidelity (Wireless Fidelity, WIFI) access point (Access Point, AP), a transmission point (TP), a wireless controller under a cloud radio access network (Cloud Radio Access Network, CRAN) scenario, a base station (gNB) in a 5G communications system, or a network-side device in a future evolved network.

Further, the foregoing terminal device may be a wireless UE, which may be a device that provides voice and/or other service data connection to a user, a handheld device with a radio communications function, a computing device, another processing device connected to a wireless modem, an on-board device, a wearable device, UE in a future 5G network, UE in a future evolved PLMN network, or the like. The wireless UE may communicate with one or more core networks through a radio access network (Radio Access Network, RAN), and the wireless UE may be a terminal device, such as a mobile phone (or "cellular" phone) and a computer with a terminal device. For example, the wireless UE may be a portable, pocket-sized, handheld, computer-built or on-board mobile device that exchanges language and/or data with a radio access network, as well as a personal communication service (PCS) phone, a cordless phone, a session initiation protocol (Session Initiation Protocol, SIP) phone, a wireless local loop (Wireless Local Loop, WLL) station, a personal digital assistant (Personal Digital Assistant, PDA) among other devices, or the wireless UE may also be a mobile device, a UE terminal, an access terminal, a radio communications device, a terminal element, a terminal station, a mobile station (Mobile Station), a mobile station (Mobile), a remote station (Remote Station), a remote station, a remote terminal (Remote Terminal), a subscriber unit (Subscriber Unit), a subscriber station (Subscriber Station), a user agent (User Agent), a terminal device, or the like. In an example, in this embodiment of the present invention, a mobile phone is shown as an example of the terminal in FIG. 1.

It should be noted that a radio communications system in the embodiment of the present invention is a network that provides a radio communication function. The radio communications system may use different communications technologies, such as code division multiple access (code division multiple access, CDMA), wideband code division multiple access (wideband code division multiple access, WCDMA), and time division multiple access (time division multiple access, TDMA), frequency division multiple access (frequency division multiple access, FDMA), orthogonal frequency-division multiple access (orthogonal frequency-division multiple access, OFDMA), single carrier FDMA (Single Carrier FDMA, SC-FDMA), carrier sense carrier sense multiple access with collision avoidance (Carrier Sense Carrier Sense Multiple Access with Collision Avoidance), and the like.

Embodiment 1

Figure 2:
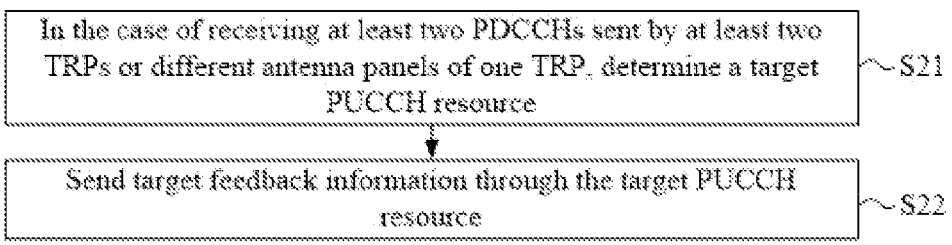
FIG. 2 is a flowchart 1 of steps of an feedback information transmission method according to an embodiment of the present invention.

An embodiment of the present invention provides a feedback information transmission method that is applied to a terminal device. Specifically, referring to FIG. 2, the feedback information transmission method includes:

S21. Determine a target PUCCH resource in the case of receiving at least two PDCCHs sent by at least two TRPs or different antenna panels of one TRP.

Specifically, the PDCCH is used to schedule a PDSCH. After receiving the at least two PDCCHs sent by at least two TRPs or different antenna panels of one TRP, the terminal device will also receive multiple PDSCHs, and the terminal device needs to send feedback information for the received multiple PDSCHs. Therefore, in the case of receiving at least two PDCCHs sent by at least two TRPs or different antenna panels of one TRP, the terminal device needs to determine a target PUCCH resource for sending the feedback information.

Exemplarily, the feedback information in the embodiment of the present invention may be an HARQ-ACK. The PDSCH scheduled by the PDCCH feeds back HARQ-ACK information in a same slot (slot).

S22. Send target feedback information through the target PUCCH resource.

The target feedback information is feedback information of each PDSCH scheduled by the at least two PDCCHs.

In the feedback information transmission method according to the embodiment of the present invention, in the case of receiving at least two PDCCHs sent by at least two transmission reception points TRPs or different antenna panels of one TRP, a target PUCCH resource is determined first, and then target feedback information of each PDSCH scheduled by the at least two PDCCHs is sent through the target PUCCH resource. That is, the embodiment of the present invention provides a method for transmitting feedback information in a multi-TRP communications system. Therefore, the embodiment of the present invention may be used to resolve the problem of how a terminal device sends feedback information in a multi-TRP scenario, improving communication effectiveness and reliability.

further, as feedback information transmission solutions in a multi-TRP communications system may be categorized into the following two types:

The first one solution is to jointly feed back one PUCCH for multiple PDSCHs transmitted by multiple TRPs, and HARQ-ACK information of different TRPs are joined together (joint HARQ-ACK payload). That is, one PUCCH resource is determined, and the PDSCH feedback information of different TRPs is sent through the one PUCCH resource.

The second solution is to separately feed back PUCCHs for multiple PDSCHs transmitted by multiple TRPs, and HARQ-ACKs of different TRPs are fed back on different PUCCHs (Separate HARQ-ACK payload). That is, multiple PUCCH resources are determined, and PDSCH feedback information of different TRPs is sent separately through the multiple PUCCH resources.

Therefore, in the case that the foregoing first solution and second solution are used as a feedback information transmission solution in a multi-TRP communication system, an implementation manner of determining the target PUCCH resource in the foregoing step S21 is described in detail below.

In a first aspect, in the case that the target PUCCH resource includes one PUCCH resource, determining the target PUCCH resource in step S21 may be implemented through the following solution:

Implementation Solution 1

Figure 3:
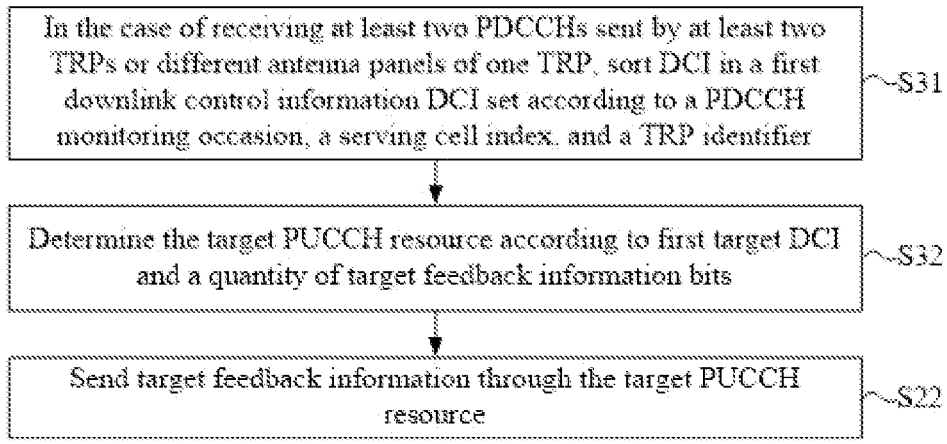
FIG. 3 is a flowchart 2 of steps of an feedback information transmission method according to an embodiment of the present invention.

Referring to FIG. 3, in the case that the quantity of the target PUCCHs is 1, the foregoing step S21 of determining the target PUCCH resource includes:

S31. Sort DCI in a first downlink control information DCI set according to a PDCCH monitoring occasion (monitoring occasion), a serving cell index (serving cell index), and a TRP identifier.

The first DCI set is DCI carried by the at least two PDCCHs, first target DCI is DCI ranked last in the first DCI set, the PDCCH monitoring occasion is a monitoring occasion of the PDCCH carrying the DCI, the serving cell index is an index of a serving cell where a PDSCH scheduled through the DCI is located, and the TRP identifier is an identifier of a TRP corresponding to the DCI or an identifier of a TRP corresponding to the PDSCH scheduled through the DCI.

That is, the terminal device sorts, according to the PDCCH monitoring occasion, the serving cell index, and the TRP identifier, the received DCI carried by the at least two PDCCHs.

Optionally, the TRP identifier is determined or distinguished through at least one of a TRP ID (identification, ID), a TRP index, a virtual cell (Virtual cell, Vcell) ID, a physical downlink control channel demodulation reference signal scrambling ID (PDCCH-DMRS-Scrambling ID), an ID of a control resource set (Control Resource set, CORESET) where a PDCCH is located, transmission control information (Transmission Control Information, TCI) of a CORESET where a PDCCH is located, an ID of a search space where a PDCCH is located, or a radio network temporary identity (Radio Network Temporary Identity, RNTI) of a scrambled PDCCH.

That is, when the terminal device can obtain a TRP ID, a TRP index, or another TRP identifier that can explicitly distinguish a TRP identifier in a multi-TRP system, the terminal device uses the TRP ID, the TRP index, or another TRP identifier to distinguish each TRP in a multi-TRP communications system; when the terminal device fails to obtain a TRP ID, a TRP index, or another TRP identifier that can explicitly distinguish a TRP identifier of each TRP in a multi-TRP system, but it can obtain a Virtual cell ID, a search space ID where a PDCCH is located, a CORESET ID where a PDCCH is located, and transmission control information (Transmission Control Information, TCI) of a CORESET where a PDCCH is located, or another TRP identifier that can implicitly distinguish a TRP identifier of each TRP in a multi-TRP communications system, the terminal device uses the Virtual cell ID, the search space ID where a PDCCH is located, and the CORESET ID where a PDCCH is located, or other information to distinguish each TRP in the multi-TRP communication system.

Optionally, sorting the DCI in the first DCI set by the terminal device according to the PDCCH monitoring occasion, the serving cell index, and the TRP identifier may specifically include:

sorting DCI in an ascending order across PDCCH monitoring occasion indexes, sorting DCI in an ascending order across serving cell indexes for a same PDCCH monitoring occasion, and sorting DCI according to a TRP identifier for a same PDCCH monitoring occasion and a same serving cell index.

Optionally, sorting the DCI in the first DCI set by the terminal device according to the monitoring occasion, the serving cell index, and the TRP identifier may specifically include:

sorting DCI in an ascending order across PDCCH monitoring occasion indexes, sorting DCI according to a TRP identifier for a same PDCCH monitoring occasion, and sorting DCI in an ascending order across serving cell indexes for a same PDCCH monitoring occasion and a same TRP identifier.

Optionally, sorting the DCI in the first DCI set by the terminal device according to the PDCCH monitoring occasion, the serving cell index, and the TRP identifier may specifically include:

sorting DCI according to a TRP identifier, sorting DCI in an ascending order across PDCCH monitoring occasion indexes for a same TRP identifier, and sorting DCI in an ascending order across serving cell indexes for a same TRP identifier and a same PDCCH monitoring occasion.

It should be noted that the foregoing sorting according to a TRP identifier may specifically be: sorting in an ascending order of sizes of the TRP identifiers, or sorting in a descending order of sizes of the TRP identifiers.

Exemplarily, the sorting according to a TRP identifier may specifically be: predefining priority of each TRP in a multi-TRP system, and sorting in a descending order of the priority of the TRPs.

Figure 4:
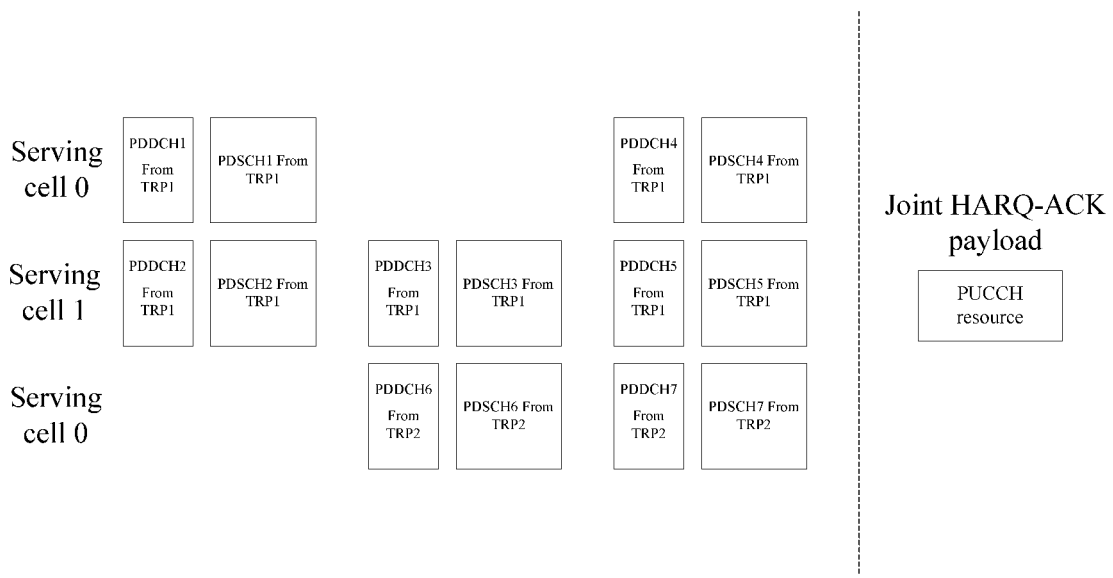
FIG. 4 is an examples 1 in which a TRP sends a PDCCH to schedule a PDSCH in a multi-TRP system according to an embodiment of the present invention.

Exemplarily, referring to FIG. 4, PDCCH1 sent by TRP1 schedules PDSCH1 transmitted in serving cell 0, PDCCH2 sent by TRP1 schedules PDSCH2 transmitted in serving cell 1, PDCCH3 sent by TRP1 schedules PDSCH3 transmitted in serving cell 1, PDCCH4 sent by TRP1 schedules PDSCH4 transmitted in serving cell 0, PDCCH5 sent by TRP1 schedules PDSCH5 transmitted in serving cell 1, PDCCH6 sent by TRP2 schedules PDSCH6 transmitted in serving cell 0, PDCCH7 sent by TRP2 schedules PDSCH7 transmitted in serving cell 0, and PDSCH1~PDSCH7 feed back HARQ-ACK information in a same slot.

In the foregoing example shown in FIG. 4, if the last DCI of TRP1 is determined according to the method of determining last DCI in a single TRP communications system in Rel-15, an order of the PDCCHs sent by TRP1 is: PDCCH1>PDCCH2>PDCCH3>PDCCH4>PDCCH5, so it can be determined that the last DCI of TRP 1 is DCI carried by PDCCH5.

If DCI with a same PDCCH monitoring occasion is sorted in a chronological order of PDCCH monitoring occasions and in an ascending order of sizes of serving cell indexes, and DCI with a same PDCCH monitoring occasion and a same serving cell index is sorted according to a TRP identifier, an order of all the PDCCHs is: PDCCH1>PDCCH2>PDCCH6>DCCH3>PDCCH4>PDCCH7>PDCCH5, so it can be determined that the first target DCI in the foregoing embodiment is DCI carried by PDDCH5 sent by TRP2.

If DCI with a same PDCCH monitoring occasion is sorted in a chronological order of PDCCH monitoring occasions and according to a TRP identifier, and DCI with a same PDCCH monitoring occasion and a same TRP identifier is sorted in an ascending order of sizes of serving cell indexes, an order of all the PDCCHs is: PDCCH1>PDCCH2>PDCCH3>PDCCH6>PDCCH4>PDCCH5>PDCCH7, so it can be determined that the first target DCI in the foregoing embodiment is DCI carried by PDDCH7 sent by TRP2.

If DCI with a same TRP identifier is sorted in an ascending order of sizes of the TRP identifiers and in a chronological order of PDCCH monitoring occasions, and DCI with a same TRP identifier and a same PDCCH monitoring occasion is sorted in an ascending order of sizes of serving cell indexes, an order of all the PDCCHs is: PDCCH1>PDCCH2>PDCCH3>PDCCH4>PDCCH5>PD- CCH6>PDCCH7, so it can be determined that the first target DCI in the foregoing embodiment is DCI carried by PDDCH7 sent by TRP2.

It should also be noted that sorting multiple pieces of DCI in the present application is to sort DCI in the first DCI set according to the PDCCH monitoring occasion, the serving cell index, and the TRP identifier. If other parameters are introduced into a single TRP for sorting, the present application may be extended to sorting according to a TRP identifier and a DCI sorting parameter of a single TRP.

S32. Determine the target PUCCH resource according to first target DCI and a quantity of target feedback information bits.

The first target DCI is DCI ranked last in the first DCI set.

Exemplarily, the foregoing step S32 may be implemented through the following steps a and b.

a. Determine a first PUCCH resource set (PUCCH resource set) according to the quantity of target feedback information bits.

The foregoing step a may specifically be: the terminal device selects a PDCCH resource set with the smallest maximum payload as the first PUCCH resource set from a PDCCH resource set with the maximum payload greater than or equal to the quantity of target feedback information bits.

Specifically, the network-side device may configure one or more (4 at most) PUCCH resource sets for the terminal device through RRC signaling, and configure by RRC signaling or pre-configure the maximum payload of each PUCCH resource set (that is, the maximum quantity of bits of UCI payload that can be carried) through the RCC signaling, and each PUCCH resource set may contain multiple PUCCH resources (a first PUCCH resource set contains a maximum of 32 PUCCH resources, and each of the remaining PUCCH resource sets contains a maximum of 8 PUCCH resources). Therefore, the terminal device may select the PDCCH resource set with the smallest maximum payload as the first PUCCH resource set from the PUCCH resource set with the maximum payload greater than or equal to the quantity of target feedback information bits.

Exemplarily, the network-side device may configure 4 PUCCH resource sets (PUCCH resource set 0, PUCCH resource set 1, PUCCH resource set 2, and PUCCH resource set 3) for the terminal device through RRC signaling, the maximum payload of PUCCH resource set 0 is 2 bits, the maximum payload of PUCCH resource set 1 is 40 bits, the maximum payload of PUCCH resource set 2 is 300 bits, the maximum payload of PUCCH resource set 3 is 1706 bits, and the quantity of target feedback information bits is 56 bits, the PUCCH resource set with the maximum payload greater than or equal to the quantity of target feedback information bits is PUCCH resource set 2 and PUCCH resource set 3, and the PUCCH resource set with a smaller maximum payload in PUCCH resource set 2 and PUCCH resource set 3 is PUCCH resource set 2, so it is determined that PUCCH resource set 2 is the first PUCCH resource set.

b. Determine the target PUCCH resource in the first PUCCH resource set according to a PUCCH resource indicator (PUCCH resource Indicator, PRI) domain of the first target DCI, or determine the target PUCCH resource in the first PUCCH resource set, or determine the target PUCCH resource in the first PUCCH resource set according to a PRI domain of a first target DCI and an index of a first control channel element (First Control Channel Element, First CCE) of the PDCCH carrying the first target DCI.

Specifically, a PRI domain of DCI occupies 3 bits and may indicate 8 different pieces of information. Therefore, in the case that a first PUCCH resource set configured by the network-side device for the terminal device is a PUCCH resource set except for the first PUCCH resource set, the first PUCCH resource set contains a maximum of 8 PUCCH resources, so the target PUCCH resource can be determined only according to the PRI domain of DCI. Therefore, in the case that a first PUCCH resource set configured by the network-side device for the terminal device is not the first PUCCH resource set, the terminal device may determine the target PUCCH resource from the first PUCCH resource set according to the PRI domain of the first target DCI. In the case that a first PUCCH resource set is the first PUCCH resource set configured by the network-side device for the terminal device, as the first PUCCH resource set can contain a maximum of 32 PUCCH resources, the target PUCCH resource cannot be determined only according to a PRI domain of DCI, it is required to determine the target PUCCH resource according to an index of a First CCE of the PDCCH carrying the first target DCI. Therefore, in the case that a first PUCCH resource set is the first PUCCH resource set configured by the network-side device for the terminal device, the terminal device may determine the target PUCCH resource from the first PUCCH resource set according to the PRI domain of the first target DCI and an index of a First CCE of the PDCCH carrying the first target DCI.

In the embodiment of the present invention, when a first target DCI is determined, DCI carried by at least two PDCCHs and received by the terminal device is sorted according to a PDCCH monitoring occasion, an index of a serving cell where a PDSCH scheduled through the DCI is located, and an identifier of a TRP corresponding to the DCI or an identifier of a TRP corresponding to the PDSCH scheduled through the DCI. Therefore, even if multiple TRPs or different antenna panels of one TRP in a multi-TRP communications system schedule multiple PDSCHs in a same serving cell and in a same PDCCH monitoring occasion, the last DCI among the DCI carried by the at least two PDCCHs and received by the terminal device may also be determined according to a TRP identifier in the embodiment of the present invention. Therefore, the problem that the last DCI cannot be determined in a multi-TRP scenario and thus the target PUCCH resource cannot be determined can be avoided according to the embodiment of the present invention.

Implementation Solution 2

Figure 5:
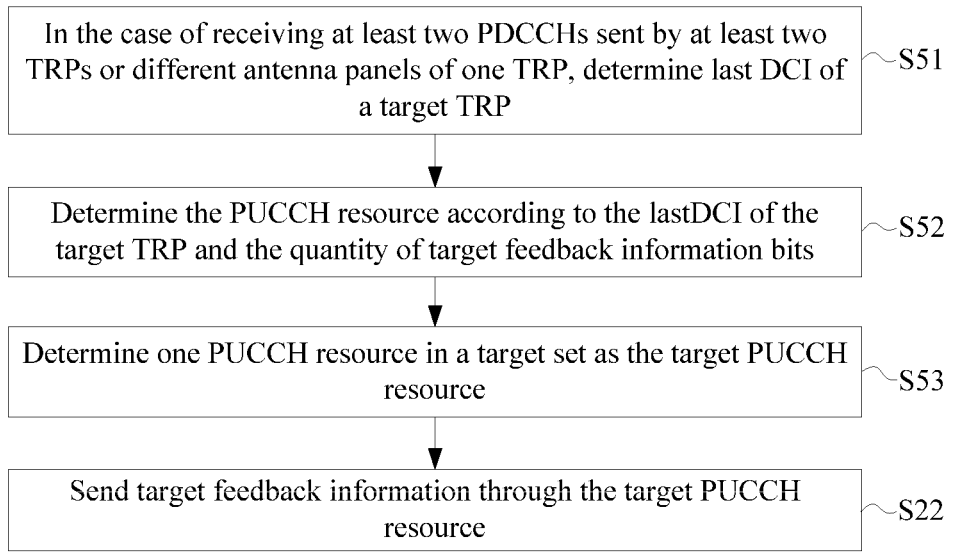
FIG. 5 is a flowchart 3 of steps of an feedback information transmission method according to an embodiment of the present invention.

Referring to FIG. 5, in the case that the quantity of the target PUCCHs is 1, the foregoing step S21 of determining the target PUCCH resource includes:

S51. Determine the last DCI in a target TRP.

The target TRP is any one of TRPs that send the at least two PDCCHs or PDSCHs.

Specifically, DCI in the target TRP may be sorted in a way as follows:

The DCI in the target TRP are sorted in a chronological order of PDCCH monitoring occasions, and the DCI with a same PDCCH monitoring occasion is sorted in an ascending order of serving cell indexes.

S52. Determine a PUCCH resource for the target TRP according to the last DCI in the target TRP and a quantity of target feedback information bits.

For an implementation manner of the foregoing step S52 of determining PUCCH resource according to the last DCI in the target TRP, reference may be made to that of the foregoing step S32 of determining the target PUCCH resource according to first target DCI and a quantity of target feedback information bits, which is no longer repeated herein.

It should be noted that the quantity of target feedback information bits is the quantity of joint HARQ-ACK feedback information bits of multiple PDSCHs of multiple TRPs.

S53. Determine one PUCCH resource in a target set as the target PUCCH resource.

The target set is a set composed of PUCCH resources of each TRP in the TRPs that send the at least two PDCCHs or PDSCHs.

Specifically, the foregoing steps S51 and S52 may be performed on each TRP in the TRPs that send the at least two PDCCHs to determine a PUCCH resource of each TRP in the TRPs that send the at least two PDCCHs or PDSCHs, and then determine the target set according to the PUCCH resource of each TRP in the TRPs that send the at least two PDCCHs or PDSCHs.

Optionally, the foregoing step S53 of determining one PUCCH resource in a target set as the target PUCCH resource may specifically be:

determining a PUCCH resource with the earliest starting symbol (starting symbol) in the target set as the target PUCCH resource;
or
determining a PUCCH resource with the earliest ending symbol (ending symbol) in the target set as the target PUCCH resource;
or
determining a PUCCH resource with the largest quantity of PRBs (number of PRBs) in the target set as the target PUCCH resource;
or
determining a PUCCH resource with the lowest bit rate in the target set as the target PUCCH resource;
or
determining a PUCCH resource with the best beam in the target set as the target PUCCH resource.

In the embodiment of the present invention, when the target PUCCH resource is determined, the last DCI in each TRP in the TRPs that send the at least two PDCCHs or PDSCHs is determined first. Therefore, even if multiple TRPs in a multi-TRP communications system schedule multiple PDSCHs in a same PDCCH monitoring occasion and in a same serving cell, the last DCI sent by each TRP can also be determined according to the embodiment of the present invention, and a PUCCH resource of each TRP is determined according to the last DCI of each TRP and a quantity of target feedback information bits, and finally one of PUCCH resources of all TRPs is selected as the target PUCCH resource for sending the target feedback information. In this case, the problem that a PUCCH resource for sending feedback information cannot be determined in a multi-TRP scenario can be avoided according to the embodiment of the present invention.

Figure 6:
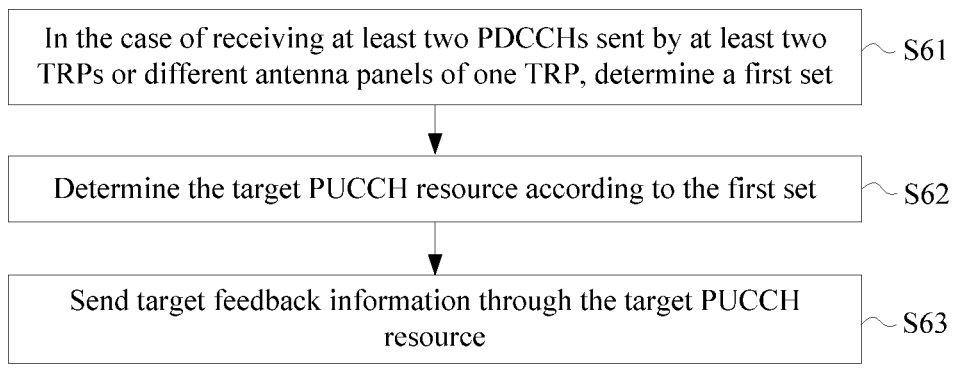
FIG. 6 is a flowchart 4 of steps of an feedback information transmission method according to an embodiment of the present invention.

In a second aspect, referring to FIG. 6, in the case that the target PUCCH resource includes at least two PUCCH resources, the foregoing step S21 of determining a target PUCCH resource includes:

S61. Determine a first set.

The first set is a set composed of PUCCH resources corresponding to each of TRPs that send the at least two PDCCHs or PDSCHs.

Specifically, the PUCCH resources corresponding to each of TRPs that send the at least two PDCCHs or PDSCHs is obtained first, and then the first set is determined according to the PUCCH resources corresponding to each of TRPs that send the at least two PDCCHs or PDSCHs.

S62. Determine the target PUCCH resource according to the first set.

An implementation manner of the foregoing step S62 is described in detail below.

Implementation Solution a

In the case that no PUCCH resources in the first set intersect in a time domain, or antenna panels corresponding to PUCCH resources that intersect in a time domain are different, the determining the target PUCCH resource according to the first set includes:

determining all PUCCH resources in the first set as the target PUCCH resource.

That is, the PUCCH resources corresponding to each of TRPs that send the at least two PDCCHs or PDSCHs is determined as the target PUCCH resource.

Further optionally, in the case of determining the target PUCCH resource through the foregoing solution a, in which all PUCCH resources in the first set are determined as the target PUCCH resource, the foregoing step S22 of sending target feedback information through the target PUCCH resource includes:

sending corresponding target feedback information in different time domains and/or on different antenna panels through each PUCCH resource in the first set.

Implementation Solution b

In the case that the first set includes PUCCH resources that intersect in a time domain and correspond to antenna panels that intersect, the determining the target PUCCH resource according to the first set includes:

determining one PUCCH resource in a second set as the target PUCCH resource according to a preset rule, and determining all PUCCH resources in a third set as the target PUCCH resource.

The second set is a set composed of PUCCH resources in the first set that intersect with another PUCCH resource in a time domain and correspond to antenna panels that intersect, and the third set is a set composed of PUCCH resources in the first set other than those in the second set.

It should be noted that the PUCCH resources corresponding to antenna panels that intersect may be that a target PUCCH corresponding to one or more PUCCH resources has no spatial contact information, that is, one or more target PUCCHs need to be sent through an omnidirectional antenna, or that spatial contact information corresponding to multiple second PUCCH resources intersects, that is, multiple target PUCCHs need to be sent on a same antenna panel.

Exemplary: the first set includes: PUCCH resource 1, PUCCH resource 2, PUCCH resource 3, and PUCCH resource 4, where PUCCH resource 1, PUCCH resource 2, and PUCCH resource 3 intersect in a time domain, and an antenna panel corresponding to PUCCH resource 1 is antenna panel 1, an antenna panel corresponding to PUCCH resource 2 is antenna panel 2, an antenna panel corresponding to PUCCH resource 3 is antenna panel 2, and an antenna panel corresponding to PUCCH resource 4 is antenna panel 3, in this case, the first set is [PUCCH resource 1, PUCCH resource 2, PUCCH resource 3, PUCCH resource 4], the second set is [PUCCH resource 2, PUCCH resource 3], and the third set is [PUCCH resource 1, PUCCH resource 4].

Further optionally, the foregoing determining one PUCCH resource in a second set as the target PUCCH resource according to a preset rule may be: determining a corresponding PUCCH resource with the highest priority of uplink control information (Uplink Control Information, UCI) in the second set as the target PUCCH resource.

That is, the corresponding PUCCH resource with the highest UCI priority in the second set is selected as the target PUCCH resource. For example, a PUCCH with the largest quantity of HARQ-ACK bits has the highest priority.

Further optionally, the foregoing determining one PUCCH resource in a second set as the target PUCCH resource according to a preset rule may be: determining a PUCCH resource with the highest priority of a TRP in the second set as the target PUCCH resource.

That is, the PUCCH resource with the highest priority of a TRP in the second set is selected as the target PUCCH resource. For example, in a scenario that two TRPs collaborate, with one serving as a master TRP and the other one serving as a secondary TRP, the TRP with the highest priority is the master TRP. Alternatively, in a scenario that two TRPs collaborate and TRP identifiers are TRP1 and TRP2 respectively, the TRP with the highest priority is TRP1.

Furthermore, in the case of determining the target PUCCH resource through the foregoing solution b, in which one PUCCH resource in the second set is determined as the target PUCCH resource according to a preset rule, and all PUCCH resources in the third set are determined as the target PUCCH resource, the foregoing step S22 of sending target feedback information through the target PUCCH resource may specifically include:

sending corresponding feedback information through the target PUCCH resource determined in the second set; discarding feedback information corresponding to another PUCCH resource other than the determined target PUCCH resource in the second set; and sending the corresponding target feedback information through each determined target PUCCH resource in the third set.

That is, in the case that the first set includes PUCCH resources that intersect in a time domain and correspond to antenna panels that intersect in the foregoing embodiment, one PUCCH resource in the second set is determined as the target PUCCH resource according to a preset rule, and all PUCCH resources in the third set are determined as the target PUCCH resource, where the second set is a set composed of PUCCH resources in the first set that intersect with another PUCCH resource in a time domain and correspond to antenna panels that intersect, and the third set is a set composed of PUCCH resources in the first set other than those in the second set. As one PUCCH is selected as the target PUCCH resource from the set composed of PUCCH resources in the first set that intersect with another PUCCH resource in a time domain and correspond to antenna panels that intersect, the problem of a conflict between multiple PUCCH resources can be resolved according to the embodiment of the present invention.

Implementation Solution c

In the case that the first set includes PUCCH resources that intersect in a time domain and correspond to different antenna panels, the determining the target PUCCH resource according to the first set includes:

determining one PUCCH resource in a first set as the target PUCCH resource according to a preset rule.

For an implementation manner of determining one PUCCH resource in a first set as the target PUCCH resource according to a preset rule in the foregoing embodiment, reference may be made to the implementation manner of determining one PUCCH resource in the second set as the target PUCCH resource according to a preset rule in the foregoing implementation solution b, which is no longer repeated herein.

further, in the case of determining the target PUCCH resource through the foregoing solution c, in which one PUCCH resource in the first set is determined as the target PUCCH resource according to a preset rule, the foregoing step S22 of sending target feedback information through the target PUCCH resource includes:

sending target feedback information corresponding to all PUCCH resources in the first set through the determined target PUCCH resource in the first set.

That is, all the target feedback information is carried on the determined target PUCCH resource in the first set for transmission.

Implementation Solution d

In the case that the first set includes PUCCH resources that intersect in a time domain and correspond to different antenna panels, the determining the target PUCCH resource according to the first set includes:

determining a pre-configured target resource as the target PUCCH resource, and determining every PUCCH resource in a third set as the target PUCCH resource;

The third set is a set composed of PUCCH resources in the first set other than those in the second set, and the second set is a set composed of PUCCH resources in the first set that intersect with another PUCCH resource in a time domain and correspond to antenna panels that intersect.

further, in the case of determining the target PUCCH resource through the foregoing solution d, in which the pre-configured target resource is determined as the target PUCCH resource, and every PUCCH resource in the third set is determined as the target PUCCH resource, the foregoing step S22 of sending target feedback information through the target PUCCH resource may specifically include:

sending target feedback information corresponding to all PUCCH resources in the second set through the pre-configured target resource, and sending the corresponding target feedback information through each determined target PUCCH resource in the third set.

Implementation Solution e

In the case that the first set includes PUCCH resources that intersect in a time domain and correspond to different antenna panels, the determining the target PUCCH resource according to the first set includes:

determining the pre-configured target resource as the target PUCCH resource.

further, in the case of determining the target PUCCH resources through the foregoing solution e, in which the pre-configured target resource is determined as the target PUCCH resource, the foregoing step S22 of sending target feedback information through the target PUCCH resource may specifically include:

sending target feedback information corresponding to all PUCCH resources in the first set through the pre-configured target resource.

That is, all the target feedback information is carried on the pre-configured target resource for transmission.

Implementation Solution f

In the case that the first set includes PUCCH resources that intersect in a time domain and correspond to antenna panels that intersect, the determining the target PUCCH resource according to the first set includes the following steps f1 and f2:

f1. Sort DCI in a second DCI set according to a PDCCH monitoring occasion, a serving cell index, and a TRP identifier.

The second DCI set is a set composed of DCI of corresponding PDSCHs that schedule each PUCCH resource in the second set, the second set is a set of PUCCH resources in the first set that intersect with another PUCCH resource in a time domain and correspond to antenna panels that intersect, the second target DCI is last DCI in the second DCI set, the PDCCH monitoring occasion is a monitoring occasion of a PDCCH carrying the DCI, the serving cell index is an index of a serving cell where a PDSCH scheduled through the DCI is located, and the TRP identifier is an identifier of a TRP corresponding to the DCI or an identifier of a TRP corresponding to a PDSCH scheduled through the DCI.

Optionally, the foregoing step f1 of sorting DCI in a second DCI set according to a PDCCH monitoring occasion, a serving cell index, and a TRP identifier includes:

sorting DCI in an ascending order across PDCCH monitoring occasion indexes, sorting DCI in an ascending order across serving cell indexes for a same PDCCH monitoring occasion, and sorting DCI according to a TRP identifier for a same PDCCH monitoring occasion and a same serving cell index;

or sorting DCI in an ascending order across PDCCH monitoring occasion indexes, sorting DCI according to a TRP identifier for a same PDCCH monitoring occasion, and sorting DCI in an ascending order across serving cell indexes for a same PDCCH monitoring occasion and a same TRP identifier;

or sorting DCI according to a TRP identifier, sorting DCI in an ascending order across PDCCH monitoring occasion indexes for a same TRP identifier, and sorting DCI in an ascending order across serving cell indexes for a same TRP identifier and a same monitoring occasion.

Further optionally, the TRP identifier is determined through at least one of a TRP ID, a TRP index, a virtual cell ID, a PDCCH-DMRS-Scrambling ID, an ID of a CORESET where a PDCCH is located, an ID of a spatial search domain where a PDCCH is located, or a RNTI of a scrambled PDCCH.

f2. Determine the target PUCCH resource according to second target DCI and a total quantity of target feedback information bits corresponding to all PUCCH resources in a second set, and determine all PUCCH resources in a third set as the target PUCCH resource.

The second target DCI is DCI ranked last in the second DCI set.

For an implementation manner of the foregoing step f2 of determining the target PUCCH resource according to second target DCI and a total quantity of the target feedback information bits corresponding to all PUCCH resources in a second set, reference may be made to that of the foregoing step S32 of determining the target PUCCH resource according to first target DCI and a quantity of target feedback information bits. A difference is that in step S32, a PUCCH resource set where the target PUCCH is located is determined according to the quantity of target feedback information bits, meanwhile in step f2, a PUCCH resource set where the target PUCCH is located is determined according to the total quantity of target feedback information bits corresponding to all PUCCH resources in the second set.

further, in the case of determining the target PUCCH resource through the foregoing solution f, in which one PUCCH resource in the second set is determined as the target PUCCH resource according to a preset rule, and all PUCCH resources in the third set are determined as the target PUCCH resource, the foregoing step S22 of sending target feedback information through the target PUCCH resource may specifically include:

sending target feedback information corresponding to all PUCCH resources in the second set through the target PUCCH resource determined according to the second target DCI, and sending corresponding feedback information through each PUCCH resource in the third set.

Implementation Solution g

In the case that the first set includes PUCCH resources that intersect in a time domain and correspond to antenna panels that intersect, the determining the target PUCCH resource according to the first set includes the following steps g1 and g2:

g1. Sort DCI in a third DCI set according to a PDCCH monitoring occasion, a serving cell index, and a TRP identifier.

The third DCI set is a set composed of DCI of corresponding PDSCHs that schedule each PUCCH resource in a first set; the PDCCH monitoring occasion is a monitoring occasion of a PDCCH carrying the DCI; and the serving cell index is an index of a serving cell where a PDSCH scheduled through the DCI is located; and the TRP identifier is an identifier of a TRP corresponding to the DCI or an identifier of a TRP corresponding to a PDSCH scheduled through the DCI.

g2. Determine the target PUCCH resource according to third target DCI and a total quantity of target feedback information bits corresponding to all PUCCH resources in a first set.

The third target DCI is DCI ranked last in the third DCI set.

For an implementation manner of the foregoing steps g1 and g2, reference may be made to that of steps f1 and f2 in the foregoing embodiment. A difference is that a sorting object in step f1 is the DCI in the second DCI set while a sorting object in step g1 is the DCI in the third DCI set, and the target PUCCH resource in step f2 is determined according to a total quantity of target feedback information bits corresponding to all PUCCH resources in the second set while the target PUCCH resource in step g2 is according to a total quantity of target feedback information bits corresponding to all PUCCH resources in the first set, which is no longer repeated herein.

further, in the case of determining the target PUCCH resource through the foregoing solution g, in which one PUCCH resource in the second set is determined as the target PUCCH resource according to a preset rule, the foregoing step S22 of sending target feedback information through the target PUCCH resource may specifically include:

sending target feedback information corresponding to all PUCCH resources in the first set through a target PUCCH resource determined according to the third target DCI.

Figure 7:
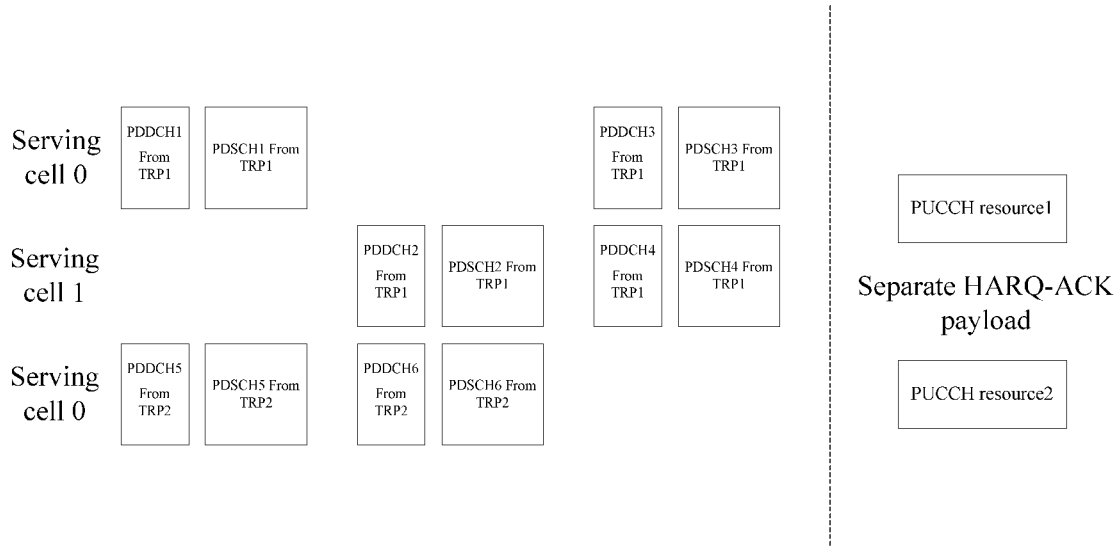
FIG. 7 is an examples 2 in which a TRP sends a PDCCH to schedule a PDSCH in a multi-TRP system according to an embodiment of the present invention.

Exemplarily, referring to FIG. 7, PDCCH1 sent by TRP1 schedules PDSCH1 transmitted in serving cell 0, PDCCH2 sent by TRP1 schedules PDSCH2 transmitted in serving cell 1, PDCCH3 sent by TRP1 schedules PDSCH3 transmitted in serving cell 0, PDCCH4 sent by TRP1 schedules PDSCH4 transmitted in serving cell 1, PDCCH5 sent by TRP2 schedules PDSCH5 transmitted in serving cell 0, PDCCH6 sent by TRP2 schedules PDSCH6 transmitted in serving cell 0, and PDSCH1~PDSCH6 feed back HARQ-ACK information in one slot. TRP1 and TRP2 determine, according to a method of determining a PUCCH resource in a single TRP communications system, PUCCH resources in their respective TRPs which are PUCCH resource 1 and PUCCH resource 2.

In the case that PUCCH resource 1 and PUCCH resource 2 don't intersect in a time domain, or an antenna panel corresponding to PUCCH resource 1 and an antenna panel corresponding to PUCCH resource 2 are different, the terminal device sends corresponding feedback information in different time domains and/or different antenna panels through PUCCH resource 1 and PUCCH resource 2 respectively. That is, the foregoing implementation solution a is adopted.

In the case that PUCCH resource 1 and PUCCH resource 2 intersect in a time domain, and an antenna panel corresponding to PUCCH resource 1 and an antenna panel corresponding to PUCCH resource 2 are the same, the terminal device performs any one of the following I to III:
  I. The terminal device discards one piece of the feedback information according to a preset rule, and transmits corresponding feedback information through another PUCCH resource. That is, the foregoing implementation solution b or c is adopted.
  II. The terminal device determines a resource pre-configured by the network-side device for the terminal device as a target PUCCH resource, integrates feedback information corresponding to PUCCH resource 1 and PUCCH resource 2, and sends the integrated feedback information through the resource pre-configured by the network-side device for the terminal device. That is, the foregoing implementation solution d or e is adopted.
  III. Sort DCI used for scheduling PUCCH resource 1 and PUCCH resource 2 according to a PDCCH monitoring occasion, a serving cell index and a TRP identifier, determine last DCI, determine a target PUCCH resource according to the last DCI, and finally multiplex the feedback information corresponding to the PUCCH resource 1 and PUCCH resource 2 on the target PUCCH resource. That is, the foregoing implementation solution f or g is adopted.

Further optionally, in the case that the terminal device works in a low frequency band, and the first set includes PUCCH resources that intersect in a time domain, the determining the target PUCCH resource according to the first set may specifically be:
  determining one PUCCH resource in a first set as the target PUCCH resource according to a preset rule.

For an implementation manner of determining one PUCCH resource in a first set as the target PUCCH resource according to a preset rule in the foregoing embodiment, reference may be made to the implementation manner of determining one PUCCH resource in the first set as the target PUCCH resource according to a preset rule in the foregoing implementation solution c, which is no longer repeated herein.

Further, in the case that the terminal device works in a low frequency band, the first set includes PUCCH resources that intersect in a time domain, and one PUCCH resource in the first set is determined as the target PUCCH resource according to a preset rule, sending the target feedback information through the target PUCCH resource may specifically include:
  sending target feedback information corresponding to all PUCCH resources in the first set through the determined target PUCCH resource in the first set.

Furthermore optionally, in the case that the terminal device works in a low frequency band, and the first set includes PUCCH resources that intersect in a time domain, a transmission mode of the target feedback information may be:
  in the case that antennas or transmission precoding matrix indicators (Transmission Precoding Matrix Indicator, TPMI) used by PUCCH resources that intersect in a time domain are different, determining all PUCCH resources in the first set as the target PUCCH resource, and transmitting the target feedback information on different time domains and/or different antennas or TPMIs through all PUCCH resources in the first set; and
  in the case that antennas or TPMIs used by PUCCH resources that intersect in a time domain are the same, determining one of PUCCH resources that intersect in a time domain and that use a same antenna or a same TPMI as the target PUCCH resource according to a specific rule, and multiplexing target feedback information corresponding to the PUCCH resources that intersect in a time domain and that use a same antenna or a same TPMI on the determined target PUCCH resource for transmission.

An implementation manner of determining one of PUCCH resources that intersect in a time domain and that use a same antenna or a same TPMI as the target PUCCH resource according to a specific rule, reference may be made to that of any one of the foregoing implementation solution b, implementation solution c, implementation solution d, implementation solution e, implementation solution f, and implementation solution g. A difference is that the second set is a set of PUCCH resources that intersect in a time domain and that use a same antenna or a same TPMI, which is no longer repeated herein.

Further optionally, in the case that physical uplink shared channel (Physical Uplink Shared Channel, PUSCH) resources intersect with at least one PUCCH resource in the first set in a time domain, and corresponding antenna panels intersect, feedback information carried by a PUCCH and data carried by a PUSCH may be transmitted in the following way:
  sending target feedback information corresponding to the at least one PUCCH resource through the PUSCH resource.

That is, the target feedback information corresponding to the at least one PUCCH resource in the first set is multiplexed on the PUSCH resource for transmission.

Further optionally, in the case that at least one PUCCH resource in the first set intersect with a PUSCH resource in a time domain, and corresponding antenna panels intersect, the sending target feedback information through the target PUCCH resource includes:
  sending the corresponding target feedback information through the at least one PUCCH resource, and discarding the PUSCH and its corresponding data;
  or
  sending corresponding data through the PUSCH resource, and discarding the at least one PUCCH and its corresponding target feedback information.

It should be noted that in the foregoing embodiment, in the case that the first set includes PUCCH resources that intersect in a time domain and correspond to antenna panels that intersect, an implementation manner of determining the target PUCCH resource according to the first set may also be applied to the case that a PUSCH resource and a PUSCH resource of a terminal device intersect in a time domain and corresponding antenna panels intersect. That is, in the case that there is no intersection among multiple PUSCH resources in one serving cell of a terminal device or multiple serving cells in an intra-band in a time domain, or in the case that PUSCH resources that intersect in a time domain correspond to different antenna panels, the terminal device transmits each PUSCH resource in a different time domain and/or a different antenna panel; in the case that multiple PUSCH resources of a terminal device include PUSCH resources that intersect in a time domain and correspond to a same antenna panel, one of the PUSCH resources is selected to transmit data corresponding to it, and discard data corresponding to the other PUSCH resources; or multiplex data corresponding to multiple PUSCH resources on one PUSCH resource for transmission.

A method of selecting one PUSCH resource among multiple PUSCH resources may be:
selecting, among the multiple PUSCH resources, a PUSCH resource corresponding to a PUSCH scheduled by the last PDCCH; or
selecting a corresponding PUSCH resource with the highest priority of PUSCH among the multiple PUSCH resources.

Embodiment 2

Figure 8:
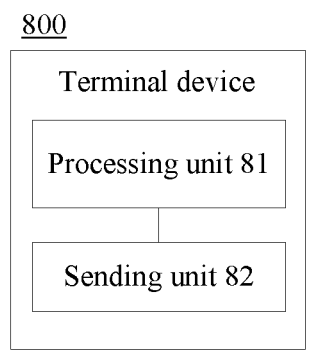
FIG. 8 is a schematic structural diagram of a terminal device according to an embodiment of the present invention.

As shown in FIG. 8, an embodiment of the present invention provides a terminal device, where the terminal device 800 includes a processing unit 81 and a sending unit 82.

The processing unit 81 is configured to determine a target PUCCH resource in the case of receiving at least two PDCCHs sent by at least two TRPs or different antenna panels of one TRP; and
the sending unit 82 is configured to send target feedback information through the target PUCCH resource, where the target feedback information is feedback information of each PDSCH scheduled by the at least two PDCCHs.

Optionally, in the case that the target PUCCH resource includes one PUCCH resource, the processing unit 81 is specifically configured to sort DCI in a first DCI set according to a PDCCH monitoring occasion, a serving cell index, and a TRP identifier, and to determine the target PUCCH resource according to first target DCI and a quantity of target feedback information bits;
where the first DCI set is DCI carried by the at least two PDCCHs, the first target DCI is DCI ranked last in the first DCI set, the PDCCH monitoring occasion is a monitoring occasion of a PDCCH carrying the DCI, the serving cell index is an index of a serving cell where a PDSCH scheduled through the DCI is located, and the TRP identifier is an identifier of a TRP corresponding to the DCI or an identifier of a TRP corresponding to a PDSCH scheduled through the DCI.

Optionally, the processing unit 81 is specifically configured to sort DCI in an ascending order across PDCCH monitoring occasion indexes, to sort DCI in an ascending order across serving cell indexes for a same PDCCH monitoring occasion, and to sort DCI according to a TRP identifier for a same PDCCH monitoring occasion and a same serving cell index.
or
to sort DCI in an ascending order across PDCCH monitoring occasion indexes, to sort DCI according to a TRP identifier for a same PDCCH monitoring occasion, and to sort DCI in an ascending order across serving cell indexes for a same PDCCH monitoring occasion and a same TRP identifier;
or
to sort DCI according to a TRP identifier, to sort DCI in an ascending order across PDCCH monitoring occasion indexes for a same TRP identifier, and to sort DCI in an ascending order across serving cell indexes for a same TRP identifier and a same PDCCH monitoring occasion.

Optionally, in the case that the target PUCCH resource includes at least two PUCCH resources, the processing unit 81 is specifically configured to determine a first set, where the first set is a set of PUCCH resources corresponding to each of TRPs that send the at least two PDCCHs or PDSCHs, and to determine the target PUCCH resource according to the first set.

Optionally, in the case that no PUCCH resources in the first set intersect in a time domain or antenna panels corresponding to PUCCH resources that intersect in a time domain are different, the processing unit 81 is specifically configured to determine all PUCCH resources in the first set as the target PUCCH resource.

Optionally, in the case that the first set includes PUCCH resources that intersect in a time domain and correspond to antenna panels that intersect, the processing unit 81 is specifically configured to determine one PUCCH resource in a second set as the target PUCCH resource according to a preset rule, and to determine all PUCCH resources in a third set as the target PUCCH resource;
The second set is a set composed of PUCCH resources in the first set that intersect with another PUCCH resource in a time domain and correspond to antenna panels that intersect, and the third set is a set composed of PUCCH resources in the first set other than those in the second set.

Optionally, the processing unit 81 is specifically configured to select a corresponding PUCCH resource with the highest UCI priority in the second set as the target PUCCH resource;
or
to determine a PUCCH resource with the highest priority of a TRP in the second set as the target PUCCH resource.

Optionally, the sending unit 82 is specifically configured to send corresponding feedback information through the target PUCCH resource determined in the second set; and to discard feedback information corresponding to another PUCCH resource other than the determined target PUCCH resource in the second set.

Optionally, in the case that the first set includes PUCCH resources that intersect in a time domain and correspond to antenna panels that intersect, the processing unit 81 is specifically configured to determine a pre-configured target resource as the target PUCCH resource, and to determine each PUCCH resource in a third set as the target PUCCH resource.

The third set is a set composed of PUCCH resources in the first set other than those in the second set, and the second set is a set composed of PUCCH resources in the first set that intersect with another PUCCH resource in a time domain and correspond to antenna panels that intersect.

Optionally, the sending unit 82 is specifically configured to send target feedback information corresponding to all PUCCH resources in the second set through the pre-configured target resource.

Optionally, in the case that the first set includes PUCCH resources that intersect in a time domain and correspond to antenna panels that intersect, the processing unit 81 is specifically configured to sort DCI in a second DCI set according to a PDCCH monitoring occasion, a serving cell index, and a TRP identifier, and to determine the target PUCCH resource according to second target DCI and a total quantity of target feedback information bits corresponding to all PUCCH resources in a second set;

The second DCI set is a set composed of DCI of corresponding PDSCHs that schedule each PUCCH resource in the second set, the second set is a set of PUCCH resources in the first set that intersect with another PUCCH resource in a time domain and correspond to antenna panels that intersect, the second target DCI is last DCI in the second DCI set, the PDCCH monitoring occasion is a monitoring occasion of a PDCCH carrying the DCI, the serving cell index is an index of a serving cell where a PDSCH scheduled through the DCI is located, and the TRP identifier is an identifier of a TRP corresponding to the DCI or an identifier of a TRP corresponding to a PDSCH scheduled through the DCI.

Optionally, the processing unit 81 is specifically configured to sort DCI in an ascending order across PDCCH monitoring occasion indexes, to sort DCI in an ascending order across serving cell indexes for a same PDCCH monitoring occasion, and to sort DCI according to a TRP identifier ID for a same PDCCH monitoring occasion and a same serving cell index;

or to sort DCI in an ascending order across PDCCH monitoring occasion indexes, to sort DCI according to a TRP identifier for a same PDCCH monitoring occasion, and to sort DCI in an ascending order across serving cell indexes for a same PDCCH monitoring occasion and a same TRP identifier;

or to sort DCI according to a TRP identifier, to sort DCI in an ascending order across PDCCH monitoring occasion indexes for a same TRP identifier, and to sort DCI in an ascending order across serving cell indexes for a same TRP identifier and a same monitoring occasion.

Optionally, the sending unit 82 is specifically configured to send target feedback information corresponding to all PUCCH resources in the second set through the target PUCCH resource determined according to the second target DCI.

Optionally, the TRP identifier is determined through at least one of a TRP identifier ID, a TRP index, a virtual cell ID, a PDCCH-DMRS-Scrambling ID, an ID of a control resource set CORESET where a PDCCH is located, an ID of a search space where a PDCCH is located, or a radio network temporary identity RNTI of a scrambled PDCCH.

In the case of receiving at least two PDCCHs sent by at least two transmission reception points TRPs or different antenna panels of one TRP, the terminal device according to the embodiment of the present invention first determines a target PUCCH resource through a processing unit, and then uses a sending unit to send target feedback information of a PDSCH scheduled by the at least two PDCCHs through the target PUCCH resource. That is, the embodiment of the present invention provides a terminal device for transmitting feedback information in a multi-TRP communications system. Therefore, the embodiment of the present invention may be used to resolve the problem of how a terminal device sends feedback information in a multi-TRP scenario, improving communication effectiveness and reliability.

Embodiment 3

Figure 9:
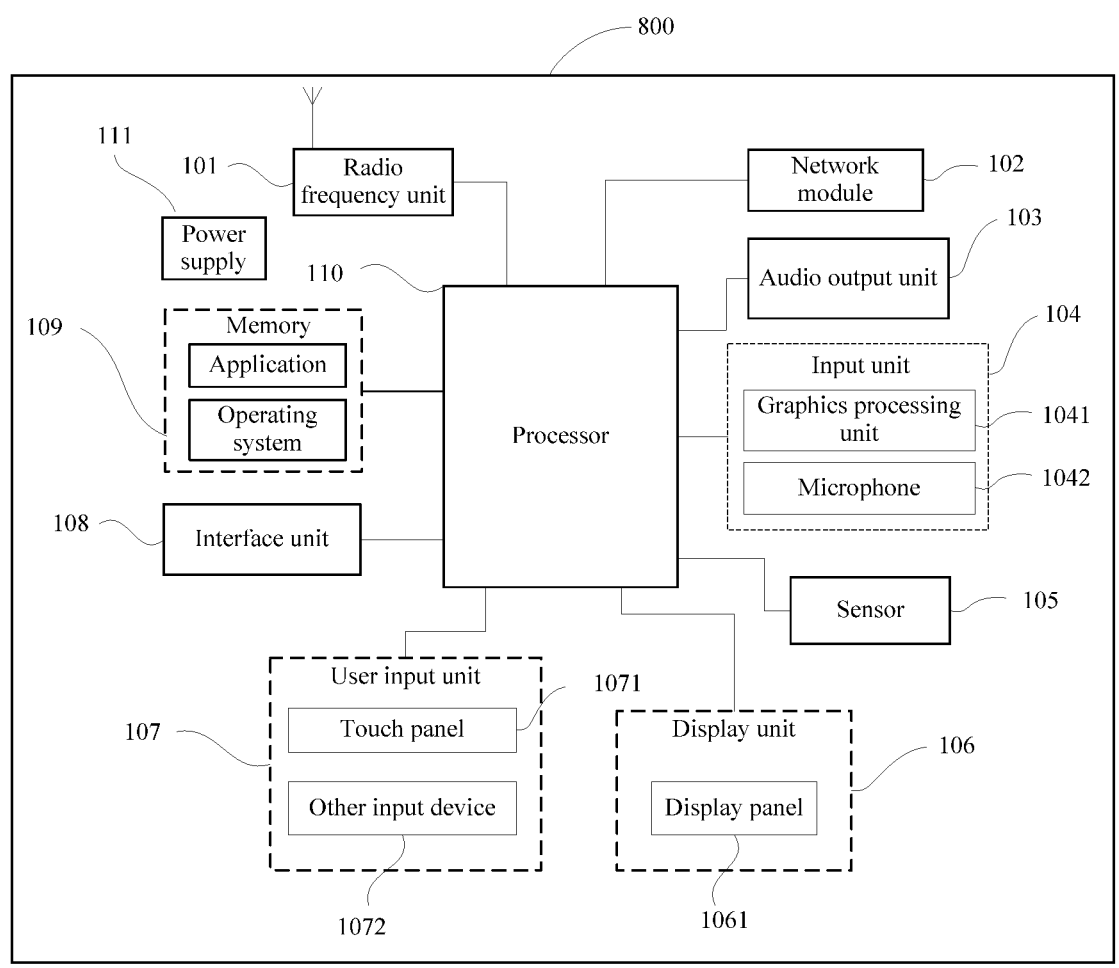
FIG. 9 is a schematic structural diagram of hardware of a terminal device according to an embodiment of the present invention.

FIG. 9 is a schematic diagram of a hardware structure of a terminal for implementing the embodiments of the present invention. The terminal 800 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device shown in FIG. 9 does not constitute a limitation to the terminal device. The terminal device may include more or fewer components than that shown in the figure, or a combination of some components, or an arrangement of different components. In this embodiment of the present invention, the terminal device includes but is not limited to a mobile phone, a tablet computer, a laptop computer, a palmtop computer, an in-vehicle terminal, a wearable device, a pedometer, or the like.

The processing unit 110 is configured to determine a target PUCCH resource in the case of receiving at least two PDCCHs sent by at least two TRPs or by different antenna panels of one TRP; and the radio frequency unit 101 is configured to send target feedback information through the target PUCCH resource, where the target feedback information is feedback information of each PDSCH scheduled by the at least two PDCCHs.

In the case of receiving at least two physical downlink control channels PDCCHs sent by at least two transmission reception points TRPs or different antenna panels of one TRP, the terminal device according to the embodiment of the present invention first determines a target PUCCH resource, and then uses the target PUCCH resource to send target feedback information of a PDSCH scheduled by the at least two PDCCHs. That is, the embodiment of the present invention provides a method for transmitting feedback information in a multi-TRP communications system. Therefore, the embodiment of the present invention may be used to resolve the problem of how a terminal device sends feedback information in a multi-TRP scenario, improving communication effectiveness and reliability.

It should be understood that in this embodiment of the present invention, the radio frequency unit 101 may be configured to receive and transmit information, or receive and transmit signals during a call. Specifically, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with a network and another device through a radio communications system.

The terminal device provides a user with wireless broadband Internet access through the network module 102, for example, helps the user send and receive emails, browse web pages, and access streaming media.

The audio output unit 103 may convert audio data received by the radio frequency unit 101 or the network module 102 or stored in the memory 109 into an audio signal and output as sound. In addition, the audio output unit 103 may further provide audio output (for example, call signal receiving sound or message receiving sound) related to a specific function performed by the terminal 800. The audio output unit 103 includes a speaker, a buzzer, a telephone receiver, and the like.

The input unit 104 is configured to receive audio or a video signal. The input unit 104 may include a graphics processing unit (Graphics Processing Unit, GPU) 1041 and a microphone 1042. The graphics processing unit 1041 processes image data of a still picture or video acquired by an image capturing apparatus (for example, a camera) in a video capturing mode or an image capturing mode. A processed image frame can be displayed on the display unit 106. The image frames processed by the graphics processing unit 1041 can be stored in the memory 109 (or another storage medium) or sent by the radio frequency unit 101 or the network module 102. The microphone 1042 may receive sound and can process such sound into audio data. The processed audio data may be output by being converted into a format that may be sent to a mobile communications base station through the radio frequency unit 101 in a telephone call mode.

The terminal device 800 further includes at least one sensor 105, such as a light sensor, a motion sensor, and other sensors. Specifically, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 800 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information input by a user or information provided to a user. The display unit 106 may include a display panel 1061. The display panel 1061 may be configured in form of LCD (Liquid Crystal Display, LCD), OLED (Organic Light-Emitting Diode), etc.

The user input unit 107 may be configured to receive input numeral or character information, and generate key signal input related to user setting and function control of the terminal device. Specifically, the user input unit 107 includes a touch panel 1071 and another input device 1072. The touch panel 1071 is also referred to as a touchscreen, and may collect a touch operation of the user on or near the touch panel (for example, an operation performed on or near the touch panel 1071 by the user by using any appropriate object or accessory such as a finger or a stylus). The touch panel 1071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor the processor 110, and receives and executes a command from the processor 110. In addition, the touch panel 1071 can be implemented in various types such as resistive, capacitive, infrared, and surface acoustic waves. In addition to the touch panel 1071, the user input unit 107 may further include the another input device 1072. Specifically, the another input device 1072 may include but is not limited to a physical keyboard, a function key (such as a volume control key or an on/off key), a trackball, a mouse, and a joystick. Details are not described herein again.

Further, the touch panel 1071 may cover the display panel 1061. After detecting a touch operation on or near the touch panel 1071, the touch panel 1071 transfers the touch operation to the processor 110 to determine a type of a touch event. Then the processor 110 provides corresponding visual output on the display panel 1061 based on the type of the touch event. Although in FIG. 9, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 800. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 108 may be configured to receive input (for example, data information and power) from the external apparatus and transmit the received input to one or more elements in the terminal device 800, or may be configured to transmit data between the terminal device 800 and the external apparatus.

The memory 109 may be configured to store a software program and various data. The memory 109 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 109 may include a high-speed random access memory, and may further include a non-volatile memory such as at least one magnetic disk storage component, a flash memory component, or another volatile solid-state storage component.

The processor 110 is a control center of the terminal device, which uses various interfaces and lines to connect all parts of the entire terminal device, and performs various functions and data processing of the terminal device by running or executing the software program and/or module stored in the memory 109 and invoking data stored in the memory 109, thereby performing overall monitoring on the terminal device. The processor 110 can include one or more processing units. Preferably, the processor 110 can be integrated with an application processor and a modem processor. The application processor mainly processes the operating system, the user interface, applications, etc. The modem processor mainly processes wireless communication. It can be understood that the above-mentioned modem processor may not be integrated in the processor 110.

The terminal 800 may further include the power supply 111 (such as a battery) that supplies power to each component. Preferably, the power supply 111 may be logically connected to the processor 110 by using a power management system, to implement functions such as charging, discharging, and power consumption management by using the power management system.

In addition, the terminal device 800 includes some functional modules that are not shown. Details are not described herein.

Embodiment 4

An embodiment of the present invention further provides a computer-readable storage medium, where the computer-readable storage medium stores a computer program. When the computer program is executed by a processor, the processes of the foregoing feedback information transmission method are implemented, with the same technical effects achieved. To avoid repetition, details are not described again herein.

The computer readable storage medium in the embodiment of the present disclosure includes a read-only memory (Read-Only Memory, ROM for short), a random access memory (Random Access Memory, RAM for short), a magnetic disk, an optical disc, or the like.

It should be noted that the terms "include", "comprise" or any other variants thereof herein are intended to cover a non-exclusive inclusion, so that a process, a method, an article or equipment that includes a list of elements not only includes those elements, and further includes another element not expressly listed, or an element inherent to such a process, a method, an article, or equipment. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present application essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. A feedback information transmission method applied to a terminal device, wherein the method comprises:
    receiving at least two physical downlink control channels (PDCCHs) sent by at least two transmission reception points (TRPs) or different antenna panels of one TRP, determining a target physical uplink control channel (PUCCH) resource, and sending target feedback information by using the target PUCCH resource, wherein the target feedback information is feedback information of each physical downlink shared channel (PDSCH) scheduled by the at least two PDCCHs;
    wherein the target PUCCH resource comprises one PUCCH resource, the determining a target PUCCH resource comprises:
        sorting DCI in a first downlink control information (DCI) set according to a PDCCH monitoring occasion, a serving cell index, and a TRP identifier;
        determining the target PUCCH resource according to first target DCI and a quantity of target feedback information bits;
    wherein the first DCI set is DCI carried by the at least two PDCCHs, the first target DCI is DCI ranked last in the first DCI set, the PDCCH monitoring occasion is a monitoring occasion of a PDCCH carrying the DCI, the serving cell index is an index of a serving cell wherein a PDSCH scheduled through the DCI is located, and the TRP identifier is an identifier of a TRP corresponding to the DCI or an identifier of a TRP corresponding to a PDSCH scheduled through the DCI.

2. The method according to claim 1, wherein the sorting DCI in a first downlink control information DCI set according to a PDCCH monitoring occasion, a serving cell index, and a TRP identifier comprises:
    sorting DCI in an ascending order across PDCCH monitoring occasion indexes, sorting DCI in an ascending order across serving cell indexes for a same PDCCH monitoring occasion, and sorting DCI according to a TRP identifier for a same PDCCH monitoring occasion and a same serving cell index;
    or
    sorting DCI in an ascending order across PDCCH monitoring occasion indexes, sorting DCI according to a TRP identifier for a same PDCCH monitoring occasion, and sorting DCI in an ascending order across serving cell indexes for a same PDCCH monitoring occasion and a same TRP identifier;
    or
    sorting DCI according to a TRP identifier, sorting DCI in an ascending order across PDCCH monitoring occasion indexes for a same TRP identifier, and sorting DCI in an ascending order across serving cell indexes for a same TRP identifier and a same PDCCH monitoring occasion.

3. The method according to claim 2, wherein the sorting DCI according to a TRP identifier for a same PDCCH monitoring occasion and a same serving cell index comprises:
    sorting DCI in an ascending order of TRP identifiers for a same PDCCH monitoring occasion and a same serving cell index.

4. The method according to claim 1, wherein in the case that the target PUCCH resource comprises at least two PUCCH resources, the determining a target PUCCH resource comprises:
    determining a first set, wherein the first set is a set composed of PUCCH resources corresponding to each of TRPs that send the at least two PDCCHs or PDSCHs; and
    determining the target PUCCH resource according to the first set.

5. The method according to claim 4, wherein in the case that no PUCCH resources in the first set intersect in a time domain, or antenna panels corresponding to PUCCH resources that intersect in a time domain are different, the determining the target PUCCH resource according to the first set comprises:
    determining all PUCCH resources in the first set as the target PUCCH resource.

6. The method according to claim 4, wherein in the case that the first set comprises PUCCH resources that intersect in a time domain and correspond to antenna panels that intersect, the determining the target PUCCH resource according to the first set comprises:

determining one PUCCH resource in a second set as the target PUCCH resource according to a preset rule, and determining all PUCCH resources in a third set as the target PUCCH resource;

wherein the second set is a set composed of PUCCH resources in the first set that intersect with another PUCCH resource in a time domain and correspond to antenna panels that intersect, and the third set is a set composed of PUCCH resources in the first set other than those in the second set.

7. The method according to claim 6, wherein the determining one PUCCH resource in a second set as the target PUCCH resource according to a preset rule comprises:

determining a corresponding PUCCH resource with the highest priority of uplink control information (UCI) in the second set as the target PUCCH resource;

or determining a PUCCH resource with the highest priority of a TRP in the second set as the target PUCCH resource.

8. The method according to claim 7, wherein the sending target feedback information through the target PUCCH resource comprises:

sending corresponding feedback information through the target PUCCH resource determined in the second set; and discarding feedback information corresponding to another PUCCH resource other than the determined target PUCCH resource in the second set.

9. The method according to claim 4, wherein in the case that the first set comprises PUCCH resources that intersect in a time domain and correspond to antenna panels that intersect, the determining the target PUCCH resource according to the first set comprises:

determining a pre-configured target resource as the target PUCCH resource, and determining all PUCCH resources in a third set as the target PUCCH resource;

wherein the third set is a set composed of PUCCH resources in the first set other than those in the second set, and the second set is a set composed of PUCCH resources in the first set that intersect with another PUCCH resource in a time domain and correspond to antenna panels that intersect.

10. The method according to claim 9, wherein the sending target feedback information through the target PUCCH resource comprises:

sending target feedback information corresponding to all PUCCH resources in the second set through the pre-configured target resource.

11. The method according to claim 1, wherein the TRP identifier comprises an identifier related to CORESET information.

12. The method according to claim 1, wherein the TRP identifier is determined through at least one of a TRP identifier ID, a TRP index, a virtual cell ID, a physical downlink control channel demodulation reference signal scrambling identification (PDCCH-DMRS-Scrambling ID), an ID of a control resource set (CORESET) wherein a PDCCH is located, an ID of a search space wherein a PDCCH is located, or a radio network temporary identity (RNTI) of a scrambled PDCCH.

13. A terminal device, comprising a processor, a memory, and a computer program stored in the memory and capable that can run on the processor, wherein the computer program, executed by the processor, implements steps of a feedback information transmission method, the method comprises:

receiving at least two physical downlink control channels PDCCHs sent by at least two transmission reception points TRPs or different antenna panels of one TRP, determining a target physical uplink control channel PUCCH resource, and sending target feedback information by using the target PUCCH resource, wherein the target feedback information is feedback information of each physical downlink shared channel PDSCH scheduled by the at least two PDCCHs;

wherein the target PUCCH resource comprises one PUCCH resource, the determining a target PUCCH resource comprises:

sorting DCI in a first downlink control information (DCI) set according to a PDCCH monitoring occasion, a serving cell index, and a TRP identifier;

determining the target PUCCH resource according to first target DCI and a quantity of target feedback information bits;

wherein the first DCI set is DCI carried by the at least two PDCCHs, the first target DCI is DCI ranked last in the first DCI set, the PDCCH monitoring occasion is a monitoring occasion of a PDCCH carrying the DCI, the serving cell index is an index of a serving cell wherein a PDSCH scheduled through the DCI is located, and the TRP identifier is an identifier of a TRP corresponding to the DCI or an identifier of a TRP corresponding to a PDSCH scheduled through the DCI.

14. The terminal device according to claim 13, wherein the sorting DCI in a first downlink control information DCI set according to a PDCCH monitoring occasion, a serving cell index, and a TRP identifier comprises:

sorting DCI in an ascending order across PDCCH monitoring occasion indexes, sorting DCI in an ascending order across serving cell indexes for a same PDCCH monitoring occasion, and sorting DCI according to a TRP identifier for a same PDCCH monitoring occasion and a same serving cell index;

or sorting DCI in an ascending order across PDCCH monitoring occasion indexes, sorting DCI according to a TRP identifier for a same PDCCH monitoring occasion, and sorting DCI in an ascending order across serving cell indexes for a same PDCCH monitoring occasion and a same TRP identifier;

or sorting DCI according to a TRP identifier, sorting DCI in an ascending order across PDCCH monitoring occasion indexes for a same TRP identifier, and sorting DCI in an ascending order across serving cell indexes for a same TRP identifier and a same PDCCH monitoring occasion.

15. The terminal device according to claim 14, wherein the sorting DCI according to a TRP identifier for a same PDCCH monitoring occasion and a same serving cell index comprises:

sorting DCI in an ascending order of TRP identifiers for a same PDCCH monitoring occasion and a same serving cell index.

16. The terminal device according to claim 13, wherein in the case that the target PUCCH resource comprises at least two PUCCH resources, the determining a target PUCCH resource comprises:

determining a first set, wherein the first set is a set composed of PUCCH resources corresponding to each of TRPs that send the at least two PDCCHs or PDSCHs; and determining the target PUCCH resource according to the first set.

17. The terminal device according to claim 16, wherein in the case that no PUCCH resources in the first set intersect in a time domain, or antenna panels corresponding to PUCCH resources that intersect in a time domain are different, the determining the target PUCCH resource according to the first set comprises:

determining all PUCCH resources in the first set as the target PUCCH resource.

18. The terminal device according to claim 16, wherein in the case that the first set comprises PUCCH resources that intersect in a time domain and correspond to antenna panels that intersect, the determining the target PUCCH resource according to the first set comprises:

determining one PUCCH resource in a second set as the target PUCCH resource according to a preset rule, and determining all PUCCH resources in a third set as the target PUCCH resource;

wherein the second set is a set composed of PUCCH resources in the first set that intersect with another PUCCH resource in a time domain and correspond to antenna panels that intersect, and the third set is a set composed of PUCCH resources in the first set other than those in the second set.

19. The terminal device according to claim 18, wherein the determining one PUCCH resource in a second set as the target PUCCH resource according to a preset rule comprises:

determining a corresponding PUCCH resource with the highest priority of uplink control information (UCI) in the second set as the target PUCCH resource;

or determining a PUCCH resource with the highest priority of a TRP in the second set as the target PUCCH resource.

20. The terminal device according to claim 13, wherein the TRP identifier comprises an identifier related to CORE-SET information.

* * * * *